Figure 1:
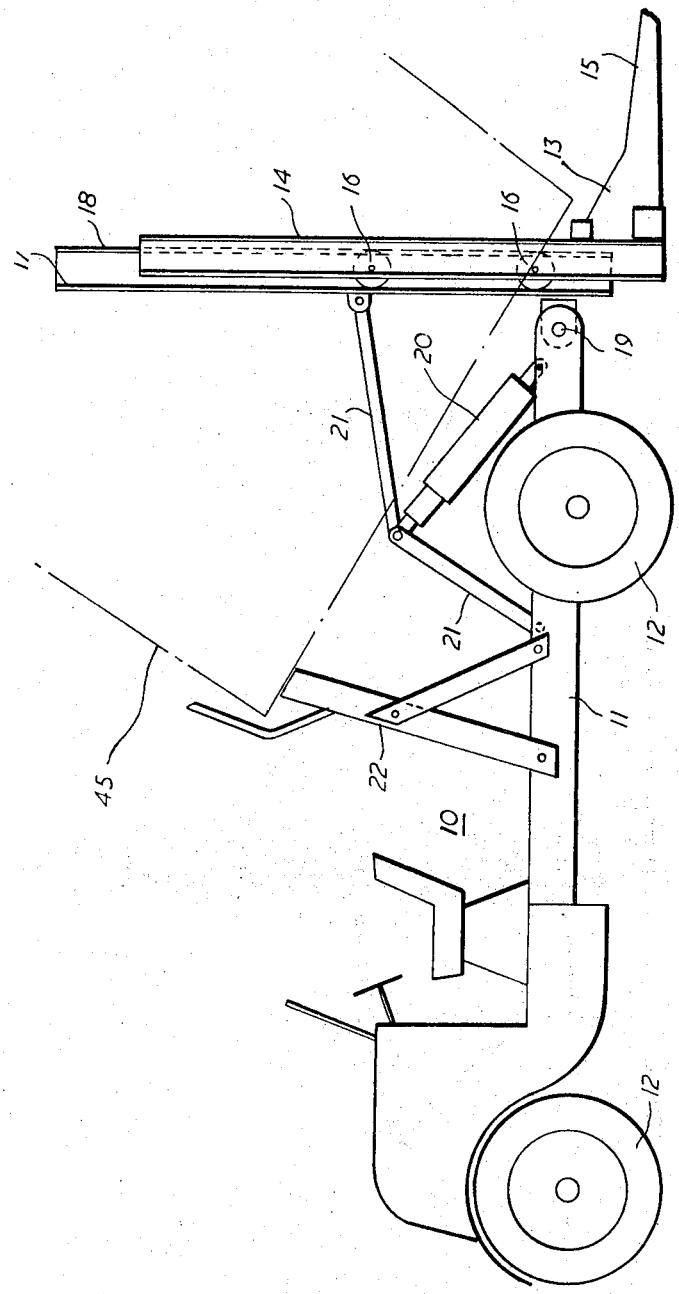

United States Patent [19]

Smith

[11] 3,790,013
[45] Feb. 5, 1974

[54] FORK-LIFT WHEELED VEHICLE
[76] Inventor: George Frederick Smith, Goodlands Farms, Shamblehurst Ln., Southampton, England
[22] Filed: June 23, 1971
[21] Appl. No.: 155,882

[52] U.S. Cl................ 214/674, 214/750, 214/654, 214/514
[51] Int. Cl............................................. B66f 9/20
[58] Field of Search... 214/672, 673, 674, 750, 620, 214/654, 6 B; 294/108

[56] References Cited
UNITED STATES PATENTS
| | | | |
|---|---|---|---|
| 2,643,013 | 6/1953 | Jackson | 214/672 |
| 2,724,522 | 11/1955 | Phebus | 214/672 |
| 3,529,735 | 9/1970 | Wehde | 294/108 |
| 3,266,599 | 8/1966 | Dearden | 214/620 |

FOREIGN PATENTS OR APPLICATIONS
238,990   7/1960   Austria .............................. 214/750

Primary Examiner—Gerald M. Forlenza
Assistant Examiner—Lawrence J. Oresky
Attorney, Agent, or Firm—Brisebois & Kruger

[57] ABSTRACT

A fork-lift vehicle for transporting bales is disclosed, having a tilting fork which acts both to lift and to transport the bales. The vehicle has a static guard frame co-operable with the fork in its tipped position to form a cage, movable side gates on the fork, and a push-off device.

3 Claims, 8 Drawing Figures

{ 3,790,013 }

FORK-LIFT WHEELED VEHICLE

This invention relates to a fork-lift wheeled vehicle.

According to the present invention, a fork-lift wheeled vehicle has a fork the tines of which extend forwardly from a back frame which extends upwardly from the roots of the tines, the fork being provided with guides which guide the fork for upward lifting movement to raise a load carried on the tines, the fork being also mounted for tilting movement which is such as to raise the tips of the tines and such as to incline the back frame, the fork when tilted being effective to cradle a load between the tines and the back frame, the fork being provided with two gates for containing a load on the fork, the two gates being disposed on the two sides respectively of the tines, the gates having a drive mechanism for opening and closing the gates.

the invention also provides a fork-lift wheeled vehicle having a fork the tines of which extend forwardly from a back frame which extends upwardly from the roots of the tines, the fork being provided with guides which guide the fork for upward lifting movement to raise a load carried on the tines, the fork being also mounted for tilting movement which is such as to raise the tips of the tines and such as to incline the back frame, the fork when tilted being effective to cradle a load between the tines and the back frame, the vehicle having a stationary guard which, when the fork is tilted, acts with the back frame and the tines to form a container for a load on the fork.

The invention further comprises a fork-lift wheeled vehicle having a fork the tines of which extend forwardly from a back frame which extends upwardly from the roots of the tines, the fork being provided with guides which guide the fork for upward lifting movement to raise a load carried on the tines, the fork being also mounted for tilting movement which is such as to raise the tips of the tines and such as to incline the back frame, the fork when tilted being effective to cradle a load between the tines and the back frame, the fork being provided with a pushing device for pushing a load from the tines.

Figure 2:
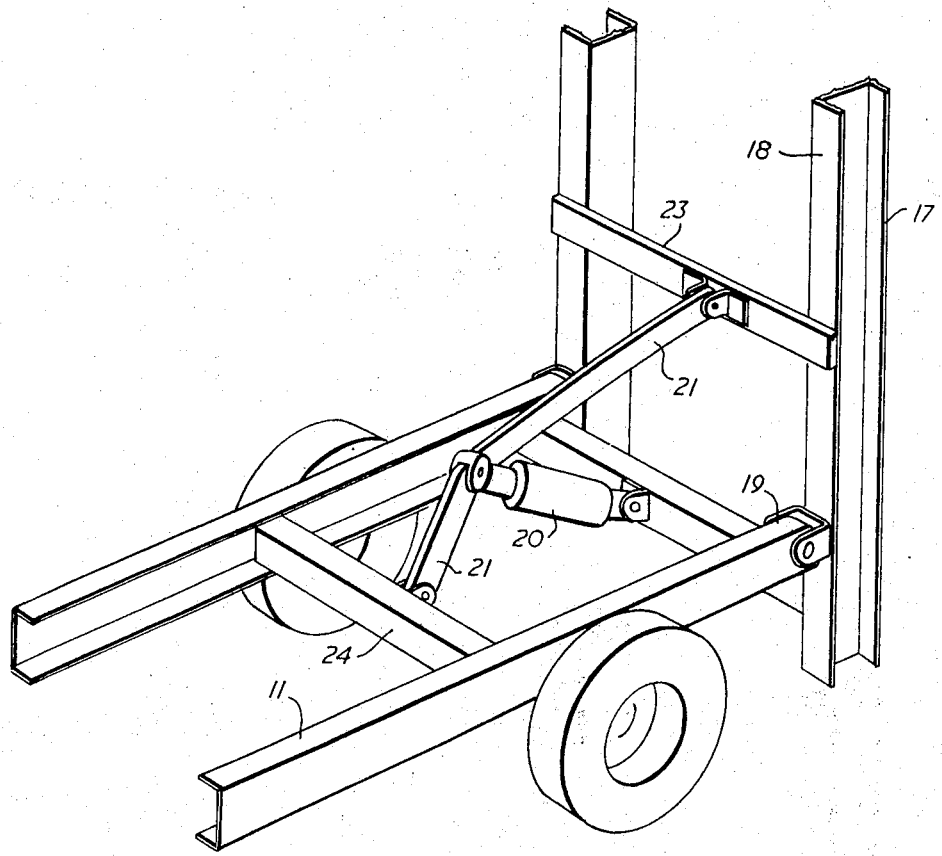
Figure 3:
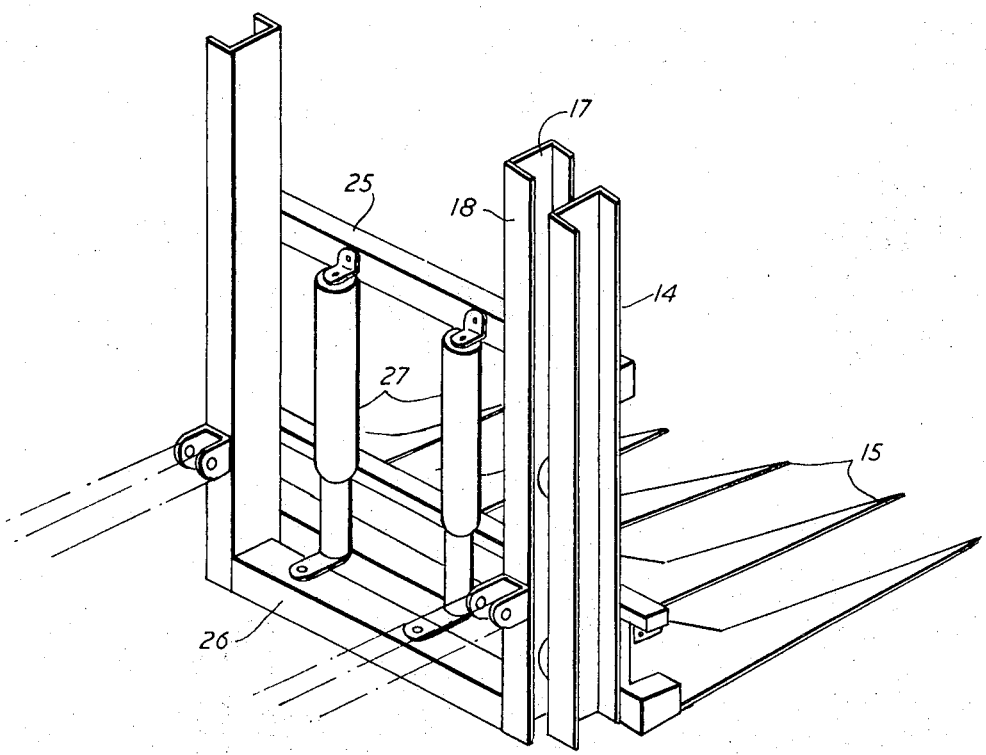
Figure 4:
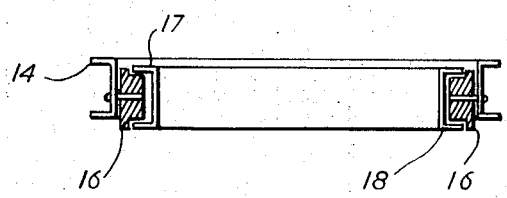
Figure 5:
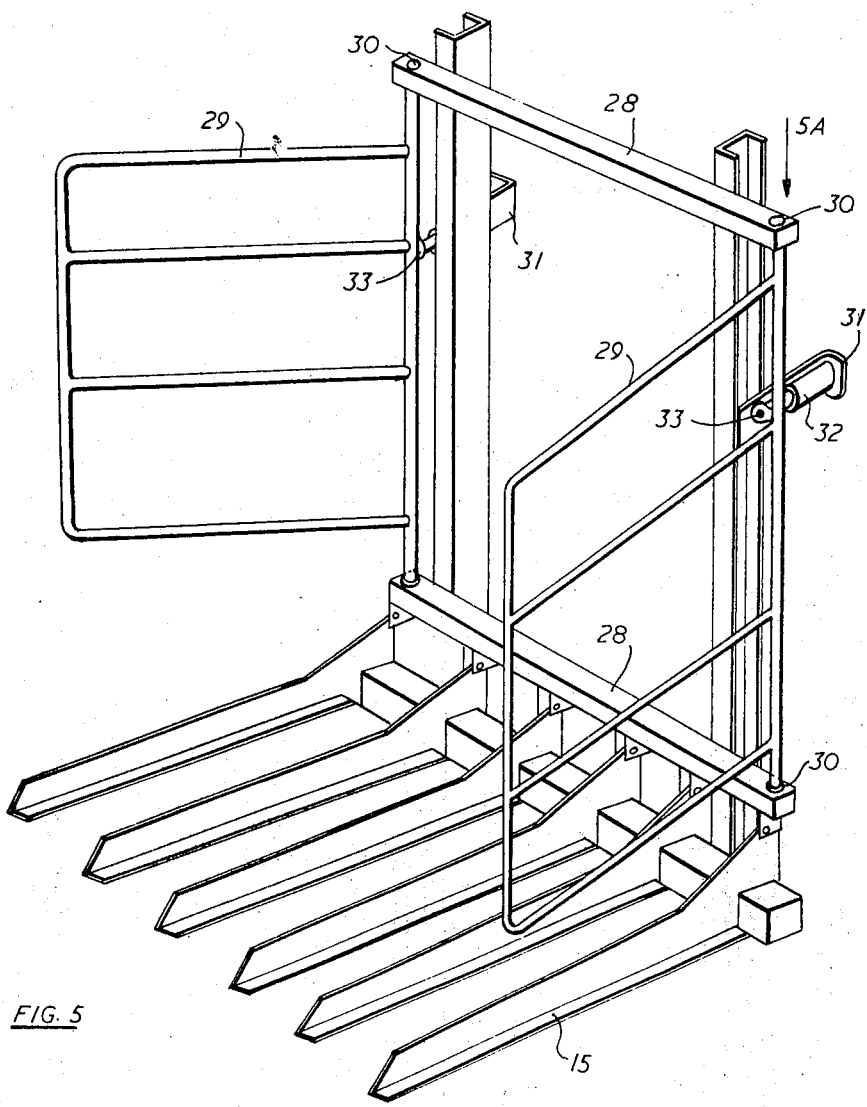
Figure 5A:
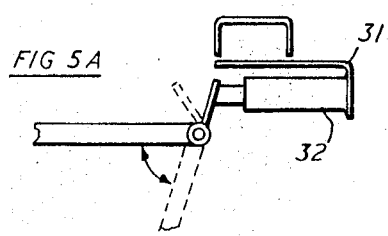
Figure 6:
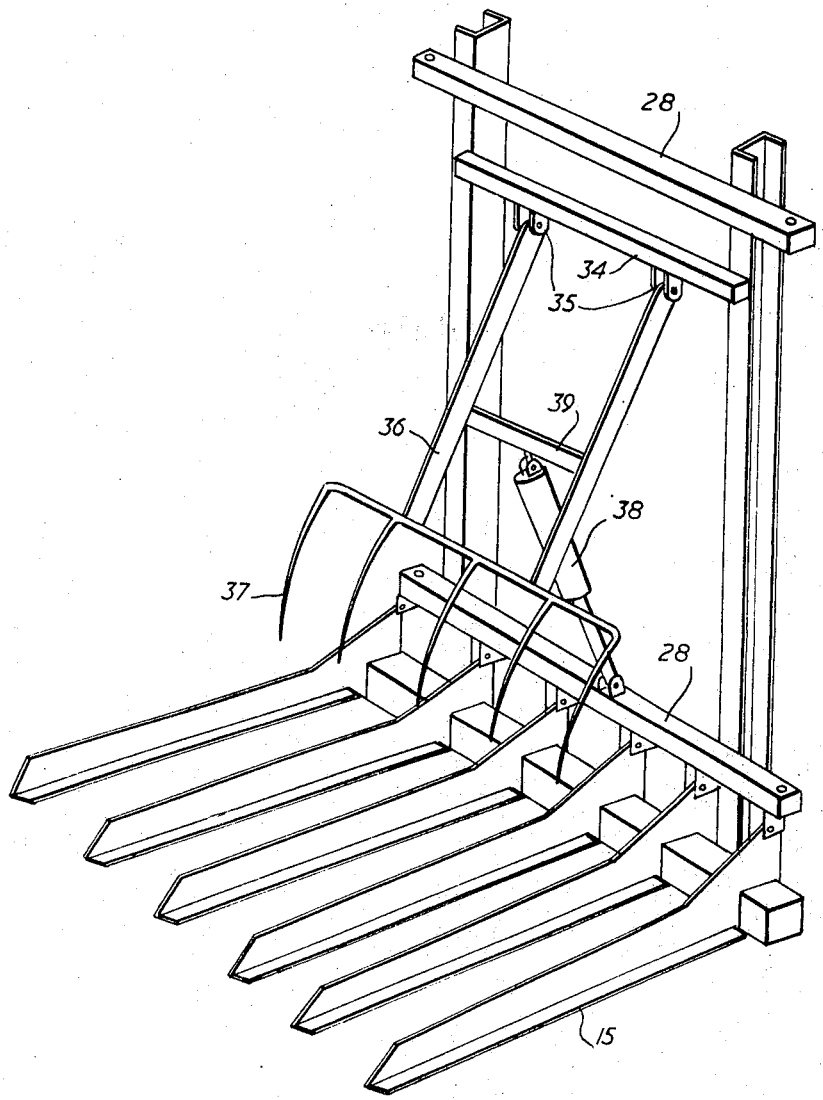
Figure 7:
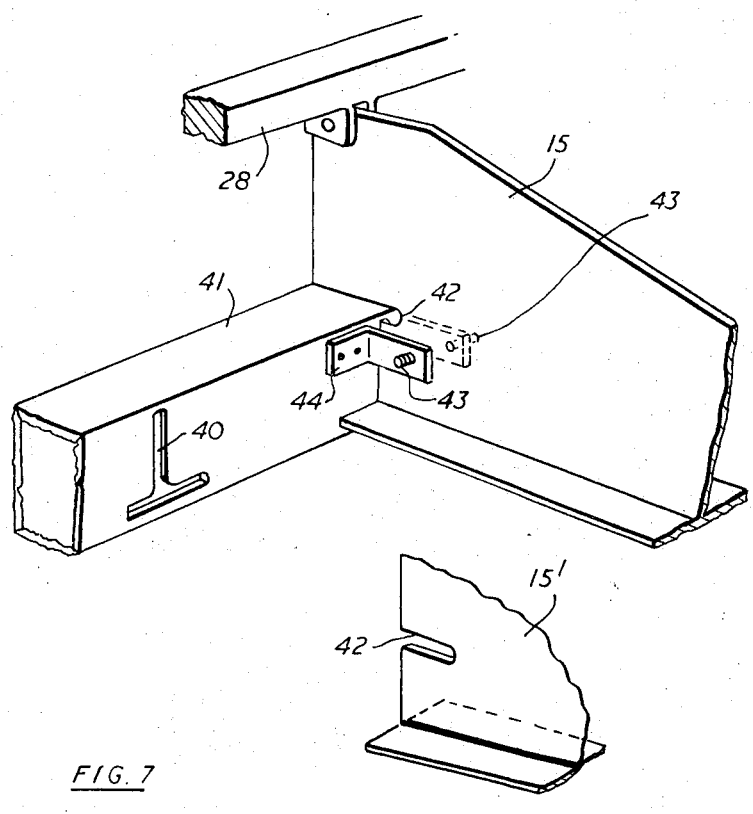

An example of the present invention will now be described with reference to the accompanying drawings in which:

FIG. 1 shows a side elevation in part of a fork-lift vehicle embodying the present invention, FIG. 2 shows in perspective an inclining frame supporting the fork of the vehicle of FIG. 1, FIG. 3 shows in perspective the frame of FIG. 2 and a rising frame included in the said fork, FIG. 4 shows in plan the manner of interengagement of the inclining frame of FIG. 2 and the rising frame of FIG. 3, FIG. 5, 5A and 6 show in perspective the fork of the vehicle of FIG. 1, and, FIG. 7 shows in perspective the mounting of the tines of the fork of FIGS. 5 and 6.

Referring to FIGS. 1 to 4, a vehicle 10 has a chassis 11 mounted on four wheels 12. The vehicle 10 is self-propelled and carries a fork 13 comprising a back or rising frame 14 bearing tines 15. The rising frame 14 has wheels 16 which run in channels 17 of an inclining frame 18 so enabling the rising frame to rise relative to the inclining frame 18 and be guided thereby.

The inclining frame 18 is pivoted by pivots 19 onto the chassis II to enable the frame 18 to tilt from an upright position as shown in full lines in FIG. 1 to an inclined position represented schematically by dotted lines. A double-acting ram 20 drives the inclining frame 18 between the upright and inclined position through a flexible linkage comprising two levers 21 joined by a pivotal connection to the ram and to one another. One of the levers is pivotally connected to the inclining frame 18 through a cross-member 23 and the other is pivotally connected to the chassis II through a cross-member 24. When inclined, the frame 18 is brought to rest on a stop 22 secured to the chassis II.

The rising frame 14 has a cross-member 25 (see FIG. 3) and the inclining frame 18 has a cross-member 26. Between the cross-members 25 and 26 are coupled two single-acting rams 27 which act to raise and lower the rising frame relative to the inclining frame. Since the tines 15 are secured to the rising frame 14, a load carried by the tines 15 can be raised by means of the rams 27.

Referring now to FIGS. 5 and 6 the rising frame 14 has two cross-members 28 which carry two hinged side gates 29 by means of pivots 30. The frame 14 has two lugs 31 each carrying a double-acting ram 32 which drives a tab 33 on a corresponding one of the gates 29. The operation of the rams 32 opens and closes the gates 29 against a load carried on the tines 15.

The rising frame 14 has a further cross-member 34 supporting by means of pivots 35 a load-moving fork 36 which incorporates tines 37. A double-acting ram 38 is coupled between the lower of the cross-members 28 and a frame-member 39 of the fork 26 to drive the fork in the direction of the tines 15 and so urge a load from the tines 15.

The tines are in inverted T shape and are hinged at their roots onto the lower cross-member 28. Each tine 15 enters a corresponding slot 40 of inverted T shape in a bottom cross-member 41 of the rising frame. The member 41 is of box-section.

A slot 42 is cut in each tine 15 to allow for entry of the tine 15 into the corresponding slot 40. Each tine 15 has a rest position extending perpendicularly outwardly from the rising frame 14 and is stopped in the rest position by engagement with the cross-member 41. One of the tines 15 is shown in FIG. 7 removed from the cross-member 41 to show clearly the root thereof.

Each tine is also provided with a pair of adjustment screws 43 threaded through brackets 44 secured to the cross-member 41. One screw 43 is provided on each side of each tine in order to allow transverse adjustment of the position of the tip of the tine.

A loose fit between the forks and the bar 28 and the bar 41 permits the adjustments of the forks.

In operation the vehicle 10 may be driven with the fork 14 in the lowered position shown in FIG. 1 to propel the tines 15 under a load to be carried on the fork. Closing of the gates 29 contain a load from sideways movement and enables slight shifting of the load on the tines. The load may now be raised vertically upwardly upon operation of the rams 27 or may be tilted upon operation of the ram 20.

If the fork is tilted to the position indicated by the dotted lines of FIG. 1 and brought to rest on the stop 22, the load is in position for transport by the vehicle 10. Preferably a guard frame is fixed to the chassis II extending upwardly parallel to the direction in which the tines extend when the fork has been tilted. The position of the guard frame is shown schematically by the dotted lines 45 of FIG. 1. Such a guard frame completes the enclosure of the load by the fork when the fork has been tilted. By operating the rams 27 when the load has been tilted the load can be raised to engage the guard frame.

The vehicle 10 is of advantage in dealing with loads in the form of stacks of bales of straw or hay, in which case the upright webs 15' of the tines will pass between adjacent bales in the bottom layer of the stack.

In lowering the fork to unload or to reload, the hinge mounting of the tines 15 allows them to rise from their rest position to accommodate unevenness of the ground on which the load rests.

The use of the load-moving fork 36,37 is of particular advantage when stacking one load of bales on top of another. If the fork 36,37 is not used, there is a tendency for the tines 15 to drag the upper load for the lower, owing to the greater friction between the tines 15 and the upper load than between the two loads themselves. By pushing the load relative to the tines 15, reliable stacking of the upper load is considerably simplified.

Furthermore the dimensions of the vehicle and fork and the degree of tilt of the fork may be such that in the transport position of the fork the load carried thereby is cradled between the tines 15 and the rising frame 14 and has its centre of gravity within the wheel-base of the vehicle 10.

An example of the invention has been constructed and been found to be capable of carrying a load of 80 bales weighing between 2 and 2½ tons.

The rams may all be supplied with hydraulic fluid from a common pump driven by the motive power unit of the vehicle 10. A bank of control valves may be used to control the supply of fluid to the rams individually except for the rams 27 which are controlled to act together.

I claim:

1. A bale stack transporting vehicle having a lifting fork comprising a back frame and a number of parallel fork tines extending perpendicular to the plane of said frame from adjacent the lower edge thereof, said fork being mounted on said vehicle for
   a. guided upward load-lifting movement with the plane of said back frame substantially vertical, and
   b. tilting movement about a transverse axis to incline said back frame away from its vertical alignment and raise the tips of the tines, thus cradling a load between said tines and said back frame, means mounting said tines on said back frame which includes an adjustment mechanism by means of which transverse adjustment may be made of the position of the tips of the tines relative to the back frame, each tine being of inverted T cross-section and pivotally mounted through the upright web thereof, the adjustment mechanism comprising set screws acting against the upright web of each tine, and a pair of laterally movable gates, one on either side of said fork, with drive means coupled to said gates to move them into contact with a load to retain it securely in position on said tines.

2. A fork-lift wheeled vehicle according to claim 1 which includes a stationary guard frame which, when the fork is in its tilted position, cooperates with the back frame and the tines to form a container for a load on the fork.

3. A vehicle according to claim 2 wherein the fork is provided with a stop for limiting the tilting of the fork, the guard frame being so inclined as to extend parallel to the tines when the fork is tilted to its limit.

* * * * *